(12) United States Patent
Yoneda et al.

(10) Patent No.: US 7,263,189 B2
(45) Date of Patent: Aug. 28, 2007

(54) DATA TRANSMISSION AND RECEIVING APPARATUS FOR DIGITAL BROADCAST SIGNALS WHICH INCLUDE CONTROL INFORMATION

(75) Inventors: Shigeru Yoneda, Tokyo (JP); Hiroyuki Koreeda, Tokyo (JP); Takumi Okamura, Tokyo (JP); Kenji Katsumata, Tokyo (JP); Yoshikazu Sugiyama, Tokyo (JP); Takahiro Sato, Tokyo (JP)

(73) Assignee: Hitachi, Ltd., Tokyo ( * ) Notice: Subject to any disclaimer, the term of this patent is extended or adjusted under 35 U.S.C. 154(b) by 724 days.

(21) Appl. No.: 09/790,207

(22) Filed: Feb. 20, 2001

(65) Prior Publication Data

US 2002/0056115 A1    May 9, 2002

(30) Foreign Application Priority Data

Apr. 20, 2000    (JP) .............................. 2000-126228

(51) Int. Cl.
*H04N 7/167* (2006.01)
*H04L 9/00* (2006.01)

(52) U.S. Cl. ...................... 380/234; 380/200; 713/165; 713/176; 705/52

(58) Field of Classification Search ................ 380/234, 380/201, 203, 200
See application file for complete search history.

(56) References Cited

U.S. PATENT DOCUMENTS

| | | | | |
|---|---|---|---|---|
| 5,459,618 A | * | 10/1995 | Kozono et al. ................ 360/31 |
| 5,530,759 A | * | 6/1996 | Braudaway et al. .......... 380/54 |
| 5,638,124 A | * | 6/1997 | Soda et al. ............ 375/240.12 |
| 5,680,500 A | * | 10/1997 | Takahashi et al. ............ 386/95 |
| 5,799,081 A | | 8/1998 | Kim et al. |
| 5,995,666 A | * | 11/1999 | Nishio et al. ................ 382/232 |
| 6,052,242 A | * | 4/2000 | Hirata .......................... 360/15 |
| 6,192,138 B1 | * | 2/2001 | Yamadaji ..................... 382/100 |
| 6,256,105 B1 | * | 7/2001 | Nobuaki et al. ........... 358/1.15 |
| 6,374,042 B1 | * | 4/2002 | Asada et al. ................ 386/126 |
| 6,449,109 B1 | * | 9/2002 | Hirata .......................... 360/15 |
| 6,457,640 B2 | * | 10/2002 | Ramachandran et al. ... 235/379 |
| 6,523,113 B1 | * | 2/2003 | Wehrenberg ................ 713/176 |
| 6,753,979 B2 | * | 6/2004 | Umeda ....................... 358/3.26 |

(Continued)

FOREIGN PATENT DOCUMENTS

EP    0715246 A1    6/1996

(Continued)

OTHER PUBLICATIONS

Fujita et al, Audio Processing on AV Decoder LSI for DVD-Audio, 2000, IEEE, pp. 578-585.*

(Continued)

*Primary Examiner*—Ayaz Sheikh
*Assistant Examiner*—Aravind K Moorthy
(74) *Attorney, Agent, or Firm*—Townsend and Townsend and Crew LLP

(57) ABSTRACT

In a transmission apparatus, still picture outputting control information is multiplexed to a transmission signal and in a receiving apparatus, still picture is extracted from moving picture. Still picture data to be outputted can be processed and the charge can be set for each kind of processing. A broadcasting system and a receiver can output the still picture data of which the copyright is protected in accordance with use.

7 Claims, 4 Drawing Sheets

U.S. PATENT DOCUMENTS

| | | | |
|---|---|---|---|
| 6,772,193 B1 * | 8/2004 | Igawa et al. | 709/203 |
| 6,788,880 B1 * | 9/2004 | Fuchigami et al. | 386/96 |
| 6,836,844 B1 * | 12/2004 | Kori et al. | 713/176 |
| 2002/0080329 A1 * | 6/2002 | Kasahara | 351/200 |
| 2004/0133785 A1 * | 7/2004 | Kugai | 713/182 |
| 2004/0159255 A1 * | 8/2004 | Ohmura | 101/484 |
| 2004/0233474 A1 * | 11/2004 | Watanabe | 358/1.15 |
| 2005/0285944 A1 * | 12/2005 | Watanabe et al. | 348/207.1 |

FOREIGN PATENT DOCUMENTS

| | | | |
|---|---|---|---|
| EP | 0726660 A1 * | 8/1996 | |
| EP | 0747845 A1 * | 12/1996 | |
| EP | 0973334 A2 | 1/2000 | |
| EP | 0975165 A2 | 1/2000 | |
| JP | 09-046678 A | 2/1997 | |
| JP | 10-178614 | 6/1998 | |
| JP | 11-086435 A | 3/1999 | |
| JP | 2000-036850 A | 2/2000 | |
| WO | WO97/25798 A1 | 7/1997 | |
| WO | WO97/43761 A2 | 11/1997 | |
| WO | WO99/26415 A1 | 5/1999 | |

OTHER PUBLICATIONS

Anonymous, ESS Indroduces Advanced, Single-Chip, Progressive-Scan DVD Multimedia Processor, 2001, PR Newswire, pp. 1-2.*

Zhongjie et al, New Algorithm for Video Watermarking, 2002, IEEE, pp. 760-763.*

Blom et al, Conversational IP Multimedia Security, 2002, IEEE, pp. 147-151.*

Augot et al. "Secure Delivery of Images over Open Networks," Proceddings of the IEEE 87:1251-1266 (1999).

* cited by examiner

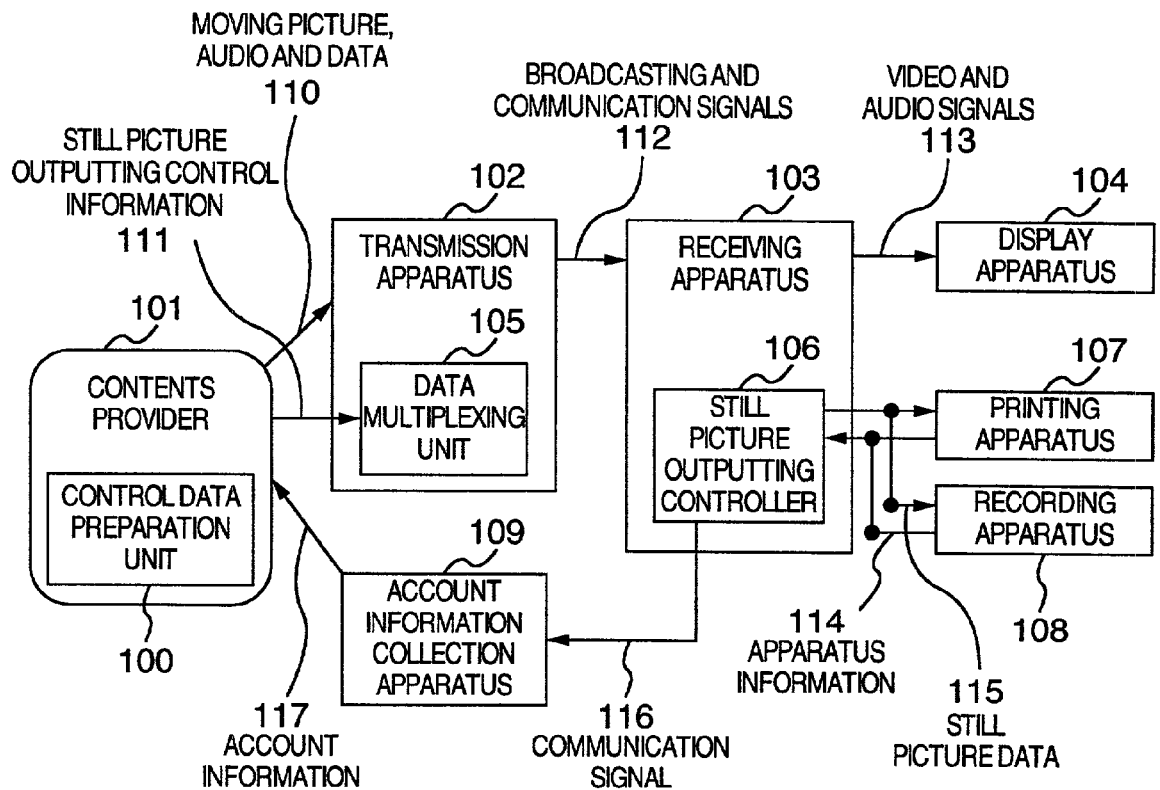

DATA TRANSMISSION AND RECEIVING APPARATUS FOR DIGITAL BROADCAST SIGNALS WHICH INCLUDE CONTROL INFORMATION

BACKGROUND OF THE INVENTION

1. Field of the Invention

The present invention relates to a data transmission and receiving apparatus for digital broadcasting and more particularly to an apparatus for extracting a static or still picture from video data in the receiving apparatus to output it to an external apparatus.

2. Description of the Related Art

A multi-channel digital broadcasting using a satellite is made by digital broadcasting using a communication satellite (CS) at present.

A conventional receiving apparatus of this digital broadcasting is disclosed in, for example, JP-A-10-178614 entitled "RECEIVING AND RECORDING/REPRODUCTION APPARATUS FOR DIGITAL BROADCASTING SIGNAL".

This digital broadcasting is the fee-charging broadcasting and accordingly contents such as video are scrambled to be transmitted. A receiving apparatus obtains a de-scrambling key by means of predetermined processing to remove the scrambling so that the contents are displayed.

Further, the receiving apparatus can output the contents such as video to an external apparatus. Accordingly, in order to protect the copyright of the contents, when the contents are outputted as an analog signal, a copy guard signal or the like is added to the analog signal or when the contents are outputted as a digital signal, the digital signal cannot be quite outputted or information for limiting the number of times for copy or the like is added to the digital signal.

SUMMARY OF THE INVENTION

Such a conventional receiving apparatus has only a copyright protection method premising that a recording apparatus for information which is temporally continuous such as video or audio signal is used as an output apparatus and a control unit is also a program unit in minimum.

Accordingly, there is a problem that when information is recorded or reused in a more complicated information unit there is no clear copyright protection method suitable for its use.

Further, when still picture data is outputted, it is considered that the still picture data is transmitted separately from moving picture data, while a sufficient amount of data cannot be transmitted in a limited transmission band.

It is an object of the present invention to provide a broadcasting system and a receiving apparatus capable of outputting abundant still picture data protected by various copyright protection methods.

In order to solve the above problems, in the transmission system of digital broadcasting according to the present invention, a still picture is extracted from video and still picture outputting control information at the time of digital outputting for secondary use is multiplexed on a transmission signal.

The still picture outputting control information includes information concerning picture quality conversion, permission time, outputting permission apparatus and the like and, if necessary, includes information for account processing.

The receiving apparatus includes data input/output means for performing data transmission to an external apparatus to obtain information concerning the external apparatus.

The still picture extraction and conversion method and the account processing method accompanying the extraction and conversion permitted or recommended by a contents provider can be presented to the user on the basis of the external apparatus information and the still picture outputting control information multiplexed to a received signal so that the user can select the methods.

The user can select a method suitable for use therefrom to obtain the still picture data.

BRIEF DESCRIPTION OF THE DRAWINGS

FIG. 1 is a schematic diagram illustrating an embodiment of the invention;

FIG. 2 is an example of a data structure of a transmission signal of the invention;

DETAILED DESCRIPTION OF THE EMBODIMENTS

Figure 3:
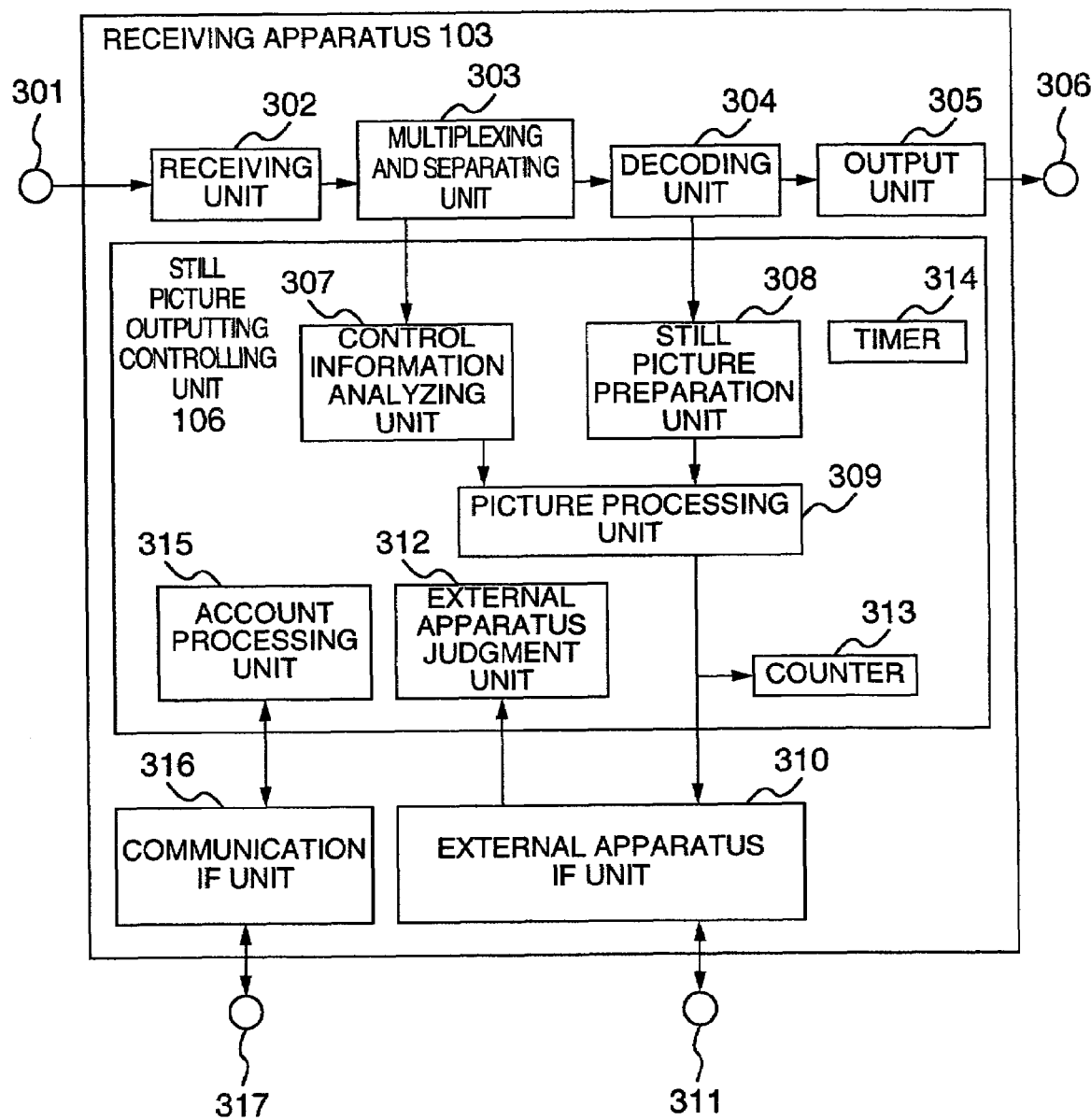
FIG. 3 is a schematic diagram illustrating a receiving apparatus used in FIG. 1.

An embodiment of the present invention is now described with reference to the accompanying drawings.

FIG. 1 illustrates a transmission apparatus and a receiving apparatus according to an embodiment of the present invention.

In FIG. 1, a contents provider 101 transmits still picture outputting control information 111 prepared by a control data preparation unit 100 to a transmission apparatus 102 in addition to broadcasting contents 110 including video data, audio data and other data prepared by the contents provider. The transmission apparatus 102 receives the broadcasting contents 110 and the still picture outputting control information 111 transmitted from the provider. The still picture outputting control information 111 is multiplexed together with the video, audio and data 110 in a data multiplexing unit 105 to be produced as broadcasting and communication signals 112.

When the MPEG2 systems which are a transmission system used in the CS digital broadcasting at present, for example, are used in the multiplexing method, the multiplexing can be made by defining a new table or descriptor. The information can be multiplexed as user data in the MPEG2 video stream.

Further, the data multiplexing unit 105 can be so configured that the still picture outputting control information 111 is converted into a predetermined format that the information can be multiplexed as it is or is converted into a format having high general-purpose properties such as a text format so that it is converted into a multiplexing format in the data multiplexing unit 105.

The broadcasting and communication signals 112 are transmitted through a satellite or a communication line to the receiving apparatus 103 and received by the receiving apparatus 103.

The receiving apparatus 103 produces video and audio signals 113 to be supplied to a display apparatus 104 such as a television set and is further controlled by a still picture outputting controller 106 to produce still picture data 115 to be supplied to an external apparatus such as a printing apparatus 107 or a recording apparatus 108. The receiving apparatus 103 includes input means for apparatus information 114 of an output apparatus. Terminals used for the input/output can be structured to be integrated into one or to be separated individually. Furthermore, the receiving apparatus 103 can be structured to be integrated with the apparatuses such as the display apparatus 104, the printing apparatus 107 and the recording apparatus 108.

Moreover, the still picture outputting controller 106 uses a communication line such as a telephone line to establish communication with an account information collection apparatus 109 to thereby settle accounts. The account information collection apparatus 109 provides account information to the contents provider 101.

In addition, the account information is outputted to a module separable from the receiving apparatus such as an IC card. Terminals for settlement are disposed in various places and the user takes the module having the account information recorded therein to the terminal to thereby perform the settlement.

FIG. 2 shows an example of a data structure of a transmission signal of the invention.

The data of FIG. 2 is transmitted as the MPEG2 video stream, for example, and includes header information 201, still picture outputting control information 202 and video data 203. The data of FIG. 2 is multiplexed in the format of MPEG2-TS or the like and transmitted as the broadcasting and communication signals 112 in FIG. 1.

The still picture outputting control information 202 is the described data in a predetermined format of the still picture outputting control information 111 prepared by the control data preparation unit 100 of FIG. 1 in order to insert the still picture outputting control information 202 into a user data area in the MPEG2 video stream, for example, and includes apparatus information 204 indicating an apparatus to which the still picture can be outputted, number-of-times information 205 indicating the number of times of outputting the still picture, extraction time information 206 indicating the time that still picture is extracted from the video, processing information 207 indicating a processing method of the extracted still picture, and an account information 208 indicating account processing corresponding to the outputting method. The apparatus information 204 indicating an apparatus to which the still picture can be outputted includes performance information such as resolution, the number of colors to be outputted, a memory capacity or the like of the output apparatus or authentication information of the output apparatus for authenticating the output apparatus. The processing information 207 includes still picture conversion quality information such as resolution for conversion thereof or a color conversion method or an irreversible compression method or compressed data size or picture data composed to still picture data or composite picture information for specifying picture data to be composed. By using such information, the video data provider can restrict user's operation in the receiving apparatus to a small still picture as a unit of the video information to protect the copyright thereof.

FIG. 3 is a schematic diagram illustrating the receiving apparatus 103 in FIG. 1.

In the receiving apparatus 103 of FIG. 3, the broadcasting and communication signals obtained by coding, multiplexing and modulating the video, audio and data are inputted from a signal input terminal 301 and received in a receiving unit 302, which demodulates the signals to be supplied to a multiplexing and separating unit 303. The multiplexing and separating unit 303 separates a predetermined signal from the demodulated signals. The video, audio and data separated in the multiplexing and separating unit 303 is decoded in a decoding unit 304 and converted to an output signal in an output unit 305 to be supplied to a CRT or the like connected to an output terminal 306.

The still picture outputting control information contained in the received signals is separated in the multiplexing and separating unit 303 to be supplied to a control information analyzing unit 307 in the still picture output controller 106.

Further, information of an output apparatus to which the data is to be outputted is obtained through an external apparatus interface (IF) unit 310 and an external apparatus judgment unit 312 judges whether the data can be outputted or not. More particularly, the judgment is made by comparing the apparatus information of the external output apparatus including the performance information such as resolution, the number of colors to be outputted, the memory capacity and the like or authentication information with the performance information or the authentication information of the output apparatus, to which the data can be outputted, contained in the still picture outputting control information.

The external apparatus interface unit 310 is considered to be structured to have the illegal utilization preventing function including, for example, authentication of a connection apparatus, encryption of data and outputting of a decoding key to the output apparatus, to which the data can be outputted. Further, a data terminal 311 can be connected to the external apparatus through radio or wire.

When an indication of outputting the still picture is received from the user, an outputting method permitted to the output apparatus or an outputting method recommended to the user is presented to the user in accordance with the still picture outputting control information 202.

Contents of the outputting method permitted or recommended to the user include the information contained in the still picture outputting control information 202, that is, the number-of-times information 205 indicating the number of times of outputting the still picture, the extraction time information 206 indicating the timing of extracting the still picture, the processing information 207 indicating the processing method of the still picture to be outputted, and an account information 208 corresponding to the outputting methods, for example.

When the user selects one of the outputting methods, the still picture is prepared in a still picture preparation unit 308 from the video data decoded in the decoding unit 304 at the timing indicated by the user with reference to time information obtained from a timer 314 and the still picture data is processed in a picture processing unit 309 by means of the method indicated by the user to be outputted through the external apparatus interface unit 310 to the data input/output terminal 311. A counter 313 counts the number of times of outputting the still picture data.

Further, an account processing unit 315 records account information according to the outputting method selected by the user.

Since an accounting method corresponds to the outputting method of picture in the still picture outputting control information 202, the charge set for each of selection items presented to the user can be designated minutely to, for example, 20 yens per sheet for a program of 20 to 30 minutes at 600 dpi once or twice and 100 yens per sheet for a program of 30 to 40 minutes at 1200 dpi three times or more or the like.

Moreover, when a predetermined period is reached or an amount of purchase held in the account processing unit reaches a predetermined amount, a communication interface (IF) unit 316 establishes communication with the account information collection apparatus 109 disposed in a customer center or the like through a telephone line or the like connected to a communication terminal 317 to settle accounts.

Figure 4:
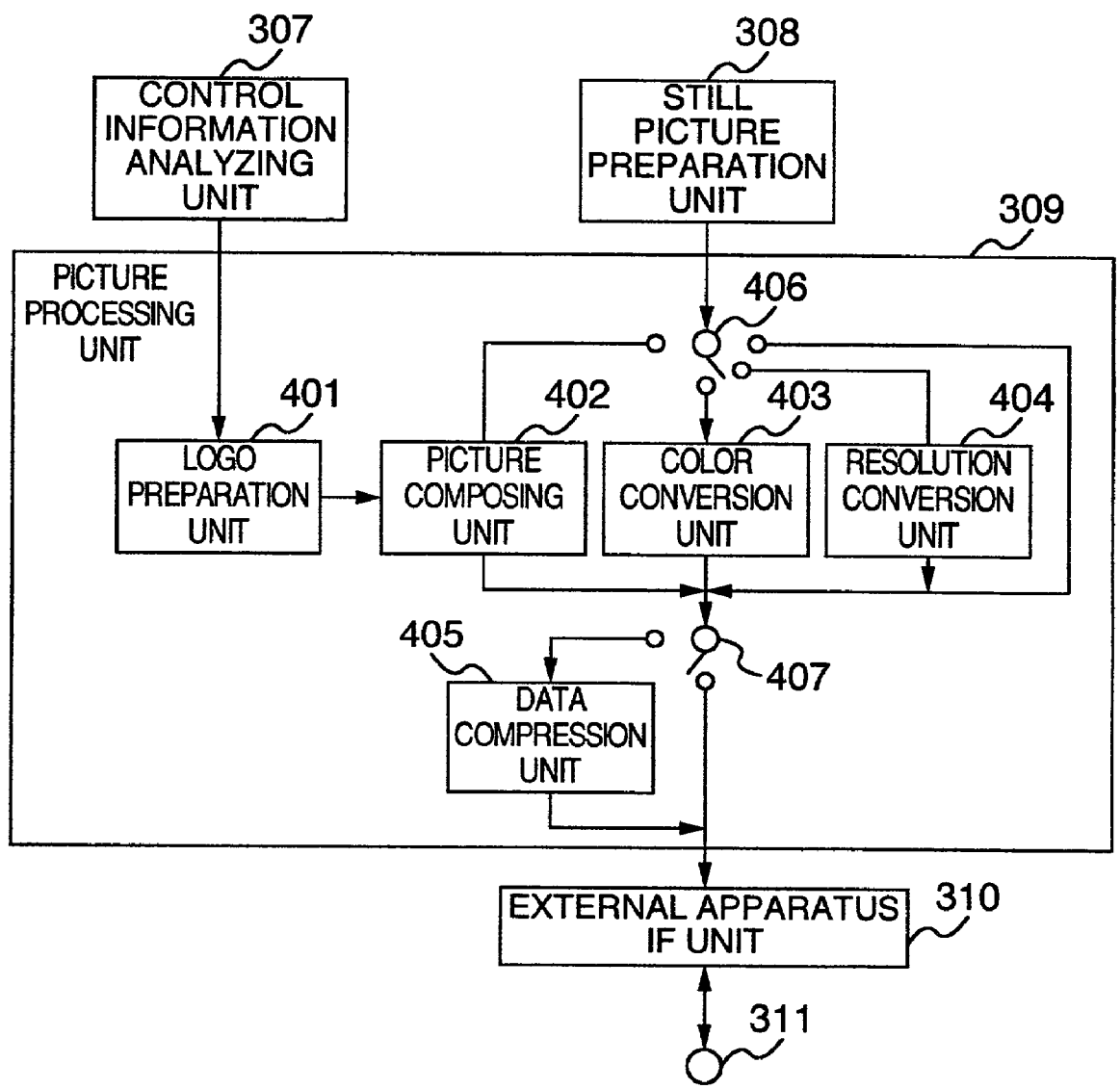
FIG. 4 is a schematic diagram illustrating an image processing unit used in FIG. 3.

FIG. 4 is a schematic diagram illustrating the picture processing unit in FIG. 3.

In FIG. 4, the method of converting still picture data obtained by the still picture preparation unit 308 is switched in a conversion method changing-over switch 406.

A picture composing unit 402 composes a picture for composition prepared in a logo preparation unit 401 and the still picture obtained by the still picture preparation unit 308. The picture for composition prepared in the logo preparation unit 401 is prepared on the basis of the picture data contained in the still picture outputting control information analyzed in the control information analyzing unit 307 or data for specifying the picture.

A color conversion unit 403 converts the still picture obtained in the still picture preparation unit 308 into color decreasing or gray-scaled or binary-digitized white and black picture data.

A resolution conversion unit 404 converts the still picture data obtained in the still picture preparation unit 308 into picture data having reduced resolution.

Further, it is also possible that the still picture obtained in the still picture preparation unit 308 does not pass through the conversion unit such as the picture composing unit 402, the color conversion unit 403 and the resolution conversion unit 404.

A data compression changing-over switch 407 performs changing-over as to whether compression is made or not. A data compression unit 405 prepares data subjected to irreversible picture compression processing in accordance with a size of the output data selected by the user.

The conversion of the still picture data as described above is performed in accordance with the processing method indicating information contained in the still picture outputting control information, that is, the picture conversion quality information such as the resolution, the color conversion method, the compression method and the compressed data size and the composite picture data or the information for specifying the composite picture.

Figure 5:
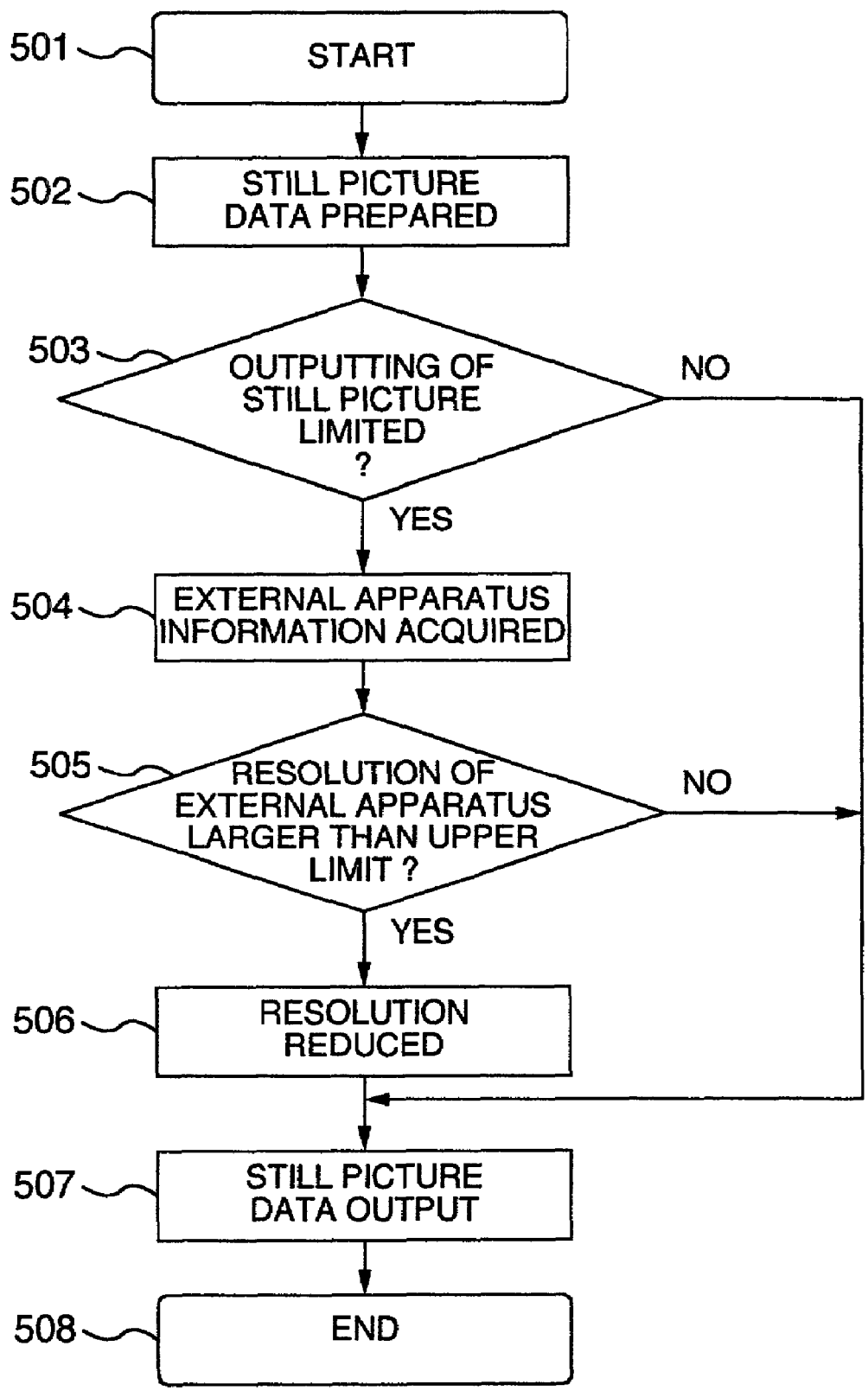
FIG. 5 is a flow chart showing operation of the embodiment of the invention.

FIG. 5 is a flow chart showing processing of the present invention. In this processing, selection items are not presented to the user and the processing automatically complies with limitation of the still picture outputting control information.

When the processing is started in response to instructions outputted by the user (step 501), the still picture preparation unit 308 prepares the still picture on the basis of the data in the decoding unit 304 (step 502).

Then, it is judged whether any limitation to outputting of the still picture is described in the information analyzed in the control information analyzing unit 307 or not (step 503). When there is any limitation to outputting of the still picture, information concerning the apparatus to which the still picture is to be outputted is acquired through the external apparatus interface unit 310 (step 504) and it is judged whether the resolution of the apparatus exceeds the upper limit of the output resolution in the still picture outputting control information or not (step 505).

When the resolution of the apparatus exceeds the upper limit, the resolution is subjected to the conversion processing (step 506) and the still picture data is then outputted (step 507). Thus, the processing is ended (step 508).

According to the present invention, in the digital broadcasting receiving apparatus, the copyright is protected in accordance with the secondary use of the still picture data so that the still picture data extracted from the moving picture data is outputted. Accordingly, abundant still picture data can be provided in the limited transmission band with the accounting system having high freedom, so that there can be provided the receiving apparatus having high convenience for both of the contents provider and the user.

What is claimed is:

1. A digital broadcast transmission apparatus comprising:
    a content source comprising picture data;
    a control information source of still picture control information; and
    a transmitter to transmit a digital broadcast signal to receiving apparatus, said digital broadcast signal comprising said picture data and said still picture control information, said still picture control information including composite picture information for specifying picture data to be composed, color conversion information for converting the color information of the still picture;
    a logo generation unit to generate a picture for composition based on said still picture control information;
    a picture composing unit to compose said picture for composition as generated by said logo generation unit and a still picture obtained from said content source;
    a color conversion unit to convert said still picture obtained from said content source to produce a color-reduced picture based on said color conversion information; and
    an output unit to output said still picture as composed by said picture composition unit and as converted by said color conversion unit,
    wherein when an indication of outputting the still picture is received, then information indicating either an outputting method that can be performed on the output apparatus in accordance with the still picture control information or a recommended outputting method in accordance with the still picture control information is presented on a display,
    wherein the information presented on a display is the number-of-times information indicating the number of times of outputting the still picture, the extraction time information indicating the timing of extracting the still picture, the processing information indicating the processing method of the still picture to be outputted, and an account information corresponding to the outputting methods.

2. A digital broadcast transmission apparatus of claim 1 further comprising a multiplexer to receive picture data and said still picture control information and to multiplex said picture data and said still picture control information to produce multiplexed data.

3. A digital broadcast transmission apparatus of claim 1 wherein said color-reduced picture has a reduced number of colors, is a gray-scale picture, or is a black-and-white picture.

4. A digital broadcast receiving apparatus comprising:
    a receiver configured to receive a digital broadcast signal, said digital broadcast signal comprising an audio-video data component and still picture control information, said still picture control information including composite picture information for specifying picture data to be composed and information indicative of a color conversion method to convert color information in a still picture;

a separator to produce an audio signal and a video signal from said audio-video data component;

a decoder to decode said audio signal and said video signal to produce respectively a decoded audio signal and a decoded video signal;

a still picture generator to produce still picture images from said decoded video signal in accordance with said composite picture information and said color conversion information; and an output unit to output said still picture images produced from said video signal by said still picture generator, wherein when an indication of outputting the still picture is received, then information indicating either an outputting method that can be performed on the output apparatus in accordance with the still picture control information or a recommended outputting method in accordance with the still picture control information is presented on a display, wherein the information presented on a display is the number-of-times information indicating the number of times of outputting the still picture, the extraction time information indicating timing of extracting the still picture, the processing information indicating the processing method of the still picture to be outputted, and an account information corresponding to the outputting methods.

5. A digital broadcast receiving apparatus of claim 4, wherein said still picture control information further includes time information indicative of periods of time during which said still pictures can be produced from said picture data as received at said receiving apparatus.

6. A digital broadcast receiving apparatus of claim 4, wherein said still picture control information further includes account information used to perform accounting operations when said still pictures are produced from said picture data as received at said receiving apparatus.

7. A digital broadcast receiving apparatus of claim 6, wherein said still picture generator performs one or more image processing operations based on said image processing information and performs one or more accounting operation based on still picture images that are produced and on said accounting information.

* * * * *